United States Patent
Rebernik

(10) Patent No.: US 12,442,492 B2
(45) Date of Patent: Oct. 14, 2025

(54) SYSTEM WITH CRYOGENIC CONTAINER AND A SINGLE-PIECE PRESSURE MANAGEMENT SYSTEM

(71) Applicants: Cryoshelter LH2 GmbH, Dobl-Zwaring (AT); Cryoshelter BioLNG GmbH, Dobl-Zwaring (AT)

(72) Inventor: Matthias Rebernik, Dobl-Zwaring (AT)

(73) Assignees: CRYOSHELTER LH2 GMBH, Dobl-Zwaring (AT); CRYOSHELTER BIOLNG GMBH, Dobl-Zwaring (AT)

( * ) Notice: Subject to any disclaimer, the term of this patent is extended or adjusted under 35 U.S.C. 154(b) by 0 days.

(21) Appl. No.: 18/691,832

(22) PCT Filed: Sep. 15, 2022

(86) PCT No.: PCT/EP2022/075618
§ 371 (c)(1),
(2) Date: Mar. 13, 2024

(87) PCT Pub. No.: WO2023/041626
PCT Pub. Date: Mar. 23, 2023

(65) Prior Publication Data
US 2024/0263748 A1  Aug. 8, 2024

(30) Foreign Application Priority Data
Sep. 15, 2021  (AT) .................................. 50190/2021

(51) Int. Cl.
*F17C 13/04*  (2006.01)

(52) U.S. Cl.
CPC ...... *F17C 13/04* (2013.01); *F17C 2205/0326* (2013.01); *F17C 2205/0352* (2013.01);
(Continued)

(58) Field of Classification Search
CPC .............. F17C 13/04; F17C 2205/0326; F17C 2205/0352; F17C 2221/012;
(Continued)

(56) References Cited
U.S. PATENT DOCUMENTS

| | | | |
|---|---|---|---|
| 9,640,808 B2 | 5/2017 | Brunner et al. | |
| 2014/0223924 A1* | 8/2014 | Gustafson | F17C 9/02 62/45.1 |

(Continued)

FOREIGN PATENT DOCUMENTS

| | | | | |
|---|---|---|---|---|
| DE | 4320556 A1 | 12/1994 | | |
| DE | 102016001343 A1 * | 8/2016 | ............. | B63H 21/14 |
| DE | 102020206689 B3 | 8/2021 | | |

OTHER PUBLICATIONS

International Search Report for International Application No. PCT/EP2022/075618, mailed Jan. 25, 2023, 4 pages.
(Continued)

*Primary Examiner* — Miguel A Diaz
*Assistant Examiner* — Ibrahim A. Michael Adeniji
(74) *Attorney, Agent, or Firm* — Workman Nydegger

(57) ABSTRACT

The invention relates to a system comprising a cryogenic container (1), in particular an LNG container or a hydrogen container, and a heat exchanger (4, 60) with a first heat exchanger tube (49) for cryogenic fluid, with a removal line (9, 10) of the cryogenic container (1) being connected to the first heat exchanger tube (49) of the heat exchanger (4), the system comprising a single-piece pressure management valve block (12) having at least a first inlet port (35), a second inlet port (36), a first outlet port (37) and a second outlet port (38), wherein at least the first inlet port (35), the first outlet port (37) and the second outlet port (38) are connected inside the single-piece pressure management valve block (12) by a connection passage, the connection passage comprising a first connecting portion on the inlet
(Continued)

side (40), a first connecting portion on the outlet side (41) and a second connecting portion on the outlet side (42), which converge at a first node (43), the single-piece pressure management valve block (12) having at least one valve recess (45) open towards the outside.

20 Claims, 10 Drawing Sheets

(52) U.S. Cl.
CPC .. *F17C 2221/012* (2013.01); *F17C 2221/033* (2013.01); *F17C 2223/0161* (2013.01); *F17C 2227/0302* (2013.01); *F17C 2250/043* (2013.01); *F17C 2250/0439* (2013.01)

(58) Field of Classification Search
CPC ........ F17C 2221/033; F17C 2223/0161; F17C 2227/0302; F17C 2250/043; F17C 2250/0439; F17C 7/04; H01J 37/04; H01J 37/32422; H05H 1/02; H05H 1/10; H05H 1/11; H05H 1/54

See application file for complete search history.

(56) References Cited

U.S. PATENT DOCUMENTS

| | | | |
|---|---|---|---|
| 2018/0266629 A1* | 9/2018 | Murray | F17C 13/04 |
| 2018/0306383 A1* | 10/2018 | Poag | F17C 7/04 |
| 2023/0228381 A1* | 7/2023 | Andreas | F17C 13/12 222/3 |

OTHER PUBLICATIONS

International Written Opinion for International Application No. PCT/EP2022/075618, mailed Jan. 25, 2023, 7 pages.

* cited by examiner

SYSTEM WITH CRYOGENIC CONTAINER AND A SINGLE-PIECE PRESSURE MANAGEMENT SYSTEM

The invention relates to a system comprising a cryogenic container, in particular an LNG container or a hydrogen container, and a heat exchanger with a first heat exchanger tube for cryogenic fluid, with a removal line of the cryogenic container being connected to the first heat exchanger tube of the heat exchanger.

According to the prior art, liquefied gases can be stored in containers ("cryogenic containers") so as to be stored as a fuel for an engine, for example. Liquefied gases are gases that are in the liquid state at boiling temperature, with the boiling temperature of this fluid being pressure-dependent. If such a cryogenic liquid is filled into a cryogenic container, a pressure corresponding to the boiling temperature is established, apart from thermal interactions with the cryogenic container itself.

In the application field of automotive engineering, the cryogenic fluid can serve as a fuel for a vehicle, for which purpose the cryogenic container is carried along on the vehicle. Cryogenic containers are usually mounted on the side of the vehicle frame, where only an extremely limited installation space is provided, however. A problem often discussed in the prior art is therefore where to place components of the removal system and the filling system of the cryogenic container. In particular, the removal system of the cryogenic container comprises a very large number of components, such as, for example, a heat exchanger, in order to heat cryogenic fluid removed from the cryogenic container for the supply to an engine of the vehicle or, respectively, to bring it into the gaseous state. Furthermore, it is known that a so-called pressure management system is provided in the removal system. A pressure management system is known, for example, from WO 2021/026580 A1 and its purpose is that cryogenic fluid heated by the external heat exchanger is branched off from the removal line and is recirculated through a further heat exchanger protruding into the cryogenic container, whereby the pressure in the cryogenic container can be increased. For this purpose, the pressure management system comprises either one or two valves.

However, the size of the components is only one of the factors limiting the available installation space. Another relevant factor is the large number of lines that have to be routed between the components. For example, looking at the system disclosed in EP 3 376 013 A1, it becomes apparent that the required lines and the associated connecting pieces occupy almost the entire available installation space on the end cap of the cryogenic container.

However, the large installation space occupied by the lines is not the only problem prevailing in systems such as those shown in EP 3 376 013 A1. Another problem is, for example, that each end of a line must be sealed when connected to a component. It is evident that errors or, respectively, connections that do not seal completely can frequently occur because of the large number of connecting pieces. Moreover, the large number of connections or, respectively, connecting pieces entail a major pressure loss, high costs and a great deal of assembly effort.

At the same time, however, the lines known from the prior art are highly valued by persons skilled in the art because they are easily replaceable and therefore easy to maintain. In addition, individual components such as the heat exchanger can be easily detached from the lines, causing the system to be highly modular.

It is the object of the invention to design the removal system of a cryogenic container so as to be more compact and less prone to errors.

This object is achieved by a system comprising a single-piece pressure management valve block having at least a first inlet port, a second inlet port, a first outlet port and a second outlet port, wherein at least the first inlet port, the first outlet port and the second outlet port are connected inside the single-piece pressure management valve block by a connection passage, the connection passage comprising a first connecting portion on the inlet side, a first connecting portion on the outlet side and a second connecting portion on the outlet side, which converge at a first node, the single-piece pressure management valve block having at least one valve recess open towards the outside, the valve recess starting at the first connecting portion on the outlet side, at the second connecting portion on the outlet side or at the node, with a valve being inserted into the valve recess of the single-piece pressure management valve block, and wherein the first heat exchanger tube is connected to the first inlet port and the first outlet port is connected to a further heat exchanger protruding into the cryogenic container and connected to the second inlet port of the single-piece pressure management valve block, optionally via a second heat exchanger tube of the first-mentioned heat exchanger.

According to the invention, a "single-piece pressure management system" is created for the first time, whereby individual lines are eliminated and the number of connecting points is reduced, resulting in a reduction of pressure losses and a decrease in costs and assembly effort. Furthermore, safety is enhanced, as there are fewer leak points. A pressure management system usually requires two separate valves, with each of them having an input line and an output line, with the valves being arranged downstream of a T-piece connected to an outlet of the heat exchanger. All those individual components and the connection points located therebetween can be combined in a single pressure management system valve block which occupies significantly less space and does not have to exhibit any internal connecting points so that it is also less prone to errors. In particular, pressure loss is minimized with the pressure management system valve block, which is a huge advantage.

According to the invention, several components of the removal system are thus combined for the first time, which is rendered possible by the pressure management system valve block. Although one would assume that a single-piece pressure management system valve block should have a greater weight than the individual components, which is considered taboo especially in vehicle engineering, it has surprisingly become apparent that, by using a pressure management system valve block, the required installation space can be reduced to such an extent that, for example, the cryogenic container itself can be designed larger or, respectively, other components can be arranged in the gained installation space, which increases the efficiency of the overall system. In addition, the reduction in the length of the lines in the system already causes the removal system to operate more efficiently and with less heat loss or, respectively, pressure loss so that the disadvantage of the additional weight is overcome already at this point. Furthermore, the weight of the block can also be optimized, for example, if the valve block is manufactured as a cast block so that an overall weight advantage can even be achieved in comparison to the prior art.

Furthermore, it has surprisingly also been shown that all of the advantages valued by the lines are preserved also in the "combined" pressure management system valve block according to the invention. On the one hand, individual components such as the heat exchanger can be separated from the pressure management system valve block just as easily. On the other hand, there is also no longer any need to replace individual lines, as they are already incorporated directly into the pressure management system valve block.

In order to further reduce the components of the system according to the invention, it can in particular be envisaged that only one valve is provided in the pressure management system valve block. For this purpose, the valve recess can start at the node of the connection passage, and the valve can be designed as a multi-way valve between the first connecting portion on the inlet side, the first connecting portion on the outlet side and the second connecting portion on the outlet side. Instead of two valves, only one valve, which is directly attached to the node, is thus provided.

In the aforementioned embodiment, it can, for example, be envisaged that the valve allows only three switching states, wherein, in the first switching state, only the connection to the first connecting portion on the outlet side is completely closed, in the second switching state, only the connection to the second connecting portion on the outlet side is completely closed and, in the third switching state, both the connection to the first connecting portion on the outlet side and that to the second connecting portion on the outlet side are completely closed.

In order to enable more precise control, it can alternatively be envisaged that the valve is designed for selectively throttling the connection to the first connecting portion on the outlet side and the connection to the second connecting portion on the outlet side, i.e., the ratio between the gas phase and the liquid phase can be chosen freely, for example, in mutual dependence with exemplary openings (in %) of 70/30, 80/20, 90/10 etc. or in mutual independence with exemplary openings (in %) of 90/90, 50/60, 10/0 etc. In any case, however, it can be envisaged that both the first connecting portion on the outlet side and the second connecting portion on the outlet side can be blocked at the same time.

As an alternative or in addition to the aforementioned embodiments, the pressure management system cannot be formed or, respectively, cannot be formed only by providing a valve at the node, but by the single-piece pressure management valve block having a first and a second valve recess open towards the outside, the first valve recess starting at the first connecting portion on the outlet side and the second valve recess starting at the second connecting portion on the outlet side, with a first valve being inserted into the first valve recess and a second valve being inserted into the second valve recess, the first and second valves each being proportional valves or valves with discrete switching states. In the case explained in further detail below in which the second inlet port is connected to the second connecting portion on the outlet side, it is preferred that the second valve recess between the node and the connection point of the second inlet port to the second connecting portion on the outlet side starts there at the latter.

The aforementioned second inlet port serves for recirculating the cryogenic fluid, which is guided to the internal heat exchanger via the first outlet port, back into the removal line in a compact manner. The connection of the second inlet port to the connecting line to the engine can be made possible in two different ways.

Firstly, the second inlet port within the pressure management valve block can be connected to the second connecting portion on the outlet side via a second connecting portion on the inlet side, or the pressure management valve block can comprise a third outlet port, the second inlet port within the pressure management valve block being connected to the third outlet port via a further connection passage, the further connection passage not communicating with the aforementioned connection passage. The last-mentioned embodiment is characterized by a particularly simple production of the pressure management valve block.

In all of the above-mentioned embodiments, it is furthermore advantageous that the valves can be used simultaneously for completely blocking a flow, which is not provided for conventional pressure management systems. In particular, the valves can be closed by means of a manually operable emergency stop switch. Alternatively, the valves can be connected to a control line which is routed to electronics of a vehicle or to a control unit of the cryogenic container, whereby the valves can be closed automatically in case of an emergency such as an accident, for example. The safety of the removal system can thereby be increased at the same time. In addition, it can be envisaged that the valves can additionally also be locked manually, e.g., in the event of service, in order to give the person the security of being able to rule out any malfunction of the valves.

According to the invention, not only the pressure management system and its connections or, respectively, branches can be combined, but other components of the system, too. In particular, it has surprisingly been established that it is even possible to combine all components of the removal system that are located between the heat exchanger and the interface to the vehicle, i.e., the connection point of the cryogenic container to the vehicle line. In particular, the pressure management valve block can comprise:

a further valve recess open towards the outside and starting at the second connecting portion on the end side, with a shut-off valve being inserted into the further valve recess.

one or several sensor recesses for a sensor, the sensor recesses being open towards the outside and starting at the first connecting portion on the inlet side, at the second connecting portion on the inlet side, at the first connecting portion on the outlet side and/or at the second connecting portion on the outlet side. In particular, a temperature sensor can be attached to the second connecting portion on the outlet side in order to measure the temperature directly in front of the second outlet port, i.e., the sensor recess is located between the node and the second outlet port or between a valve opening in the second connecting portion on the outlet side and the second outlet port.

Furthermore, the single-piece pressure management valve block can have at least one further connection passage which is not connected to any of the aforementioned connection passages, the further connection passage being connected to an input line or output line for heat exchange medium, to the cryogenic container for the removal of cryogenic fluid or to the internal heat exchanger for the recirculation of cryogenic fluid through a second heat exchanger tube. The pressure management valve block can also have several of these further connection passages. These are therefore further independent passages, e.g., a through bore, for achieving an even more compact design. According to the invention, several connection passages can thus the present in the pressure management valve block, which are not interconnected or are interconnected only via the bypass lines mentioned below. In a special case, all inlets and outlets of the heat exchanger are connected to openings in the pressure management valve block so that the heat exchanger only needs to be connected to the pressure management valve block and not to any other lines.

In a further embodiment, the system can furthermore comprise a bypass line for connecting the first heat exchanger tube in parallel, a second bypass line for connecting a second heat exchanger tube of the or an external heat exchanger in parallel and/or a bypass line for connecting the internal heat exchanger in parallel, wherein at least one of the bypass lines within the pressure management valve block is connected to the connection passage or to a further connection passage and a valve recess is preferably provided for controlling the mass flow via the bypass line. By means of the bypass lines, a mass flow of cryogenic fluid to the respective heat exchanger tube can be connected in parallel in order to achieve a temporary reduction in the pressure loss, since the pressure loss via a heat exchanger is generally higher than that via a bypass line. If the bypass line is routed completely within the valve block, it is a connecting portion between two other connecting portions. However, a bypass line can also be guided out of the valve block, e.g., to another valve block, so that the bypass line can be a combination of one or several connecting portions in one or several valve blocks and an intermediate line.

Particularly preferably, the first inlet port of the single-piece pressure management valve block is directly connected to the first heat exchanger tube or, respectively, a first outlet of the heat exchanger, without any intermediate line. The pressure management valve block can thus be attached directly to the heat exchanger without the need for an intermediate line.

If the heat exchanger comprises only one heat exchanger tube, the internal heat exchanger can be connected directly to the second inlet port, via a connecting line. However, it is preferred if the heat exchanger comprises a second heat exchanger tube, and wherein the second inlet port of the single-piece pressure management valve block is directly connected to the second heat exchanger tube or, respectively, a second outlet of the heat exchanger, without any intermediate line. In this way, it can, in turn, be made possible that no space has to be provided between the heat exchanger and the pressure management valve block.

A particularly large amount of space can be saved if the heat exchanger has a rod-shaped design with a generated surface and two lateral surfaces, with the pressure management valve block being arranged in an extension of the heat exchanger next to one of the lateral surfaces.

Surprisingly, the pressure management valve block even makes it possible that the pressure management valve block can replace a lateral surface of the heat exchanger, e.g., if the heat exchanger comprises a jacket, the pressure management valve block forming one of the lateral surfaces of the heat exchanger and a first end of the jacket being connected to the pressure management valve block in a fluid-tight manner.

In general, the pressure management valve block could be arranged next to an end cap of the cryogenic container in order to gain space there. However, especially in case of the present pressure management valve block, it makes sense to arrange both components on the generated surface, as a result of which no additional space has to be provided next to the cryogenic container, whereby the latter can be designed so as to be particularly long. For this purpose, the cryogenic container has a cryogenic container jacket and two end caps, wherein the heat exchanger is arranged essentially in parallel to the cryogenic container jacket and both the heat exchanger and the pressure management valve block next to the cryogenic container jacket lie at least partially, preferably completely, between the outer faces of the end caps, i.e., will not protrude in the longitudinal direction of the cryogenic container beyond the latter, whereby connecting lines at the side of the cryogenic container can be installed more easily and could protrude longitudinally beyond the cryogenic container.

Alternatively or additionally, the heat exchanger and/or the pressure management valve block could also protrude beyond one of the end caps, with at least one, preferably all, of the inlet ports and/or outlet ports being arranged in a direction towards the vehicle frame, i.e., lying perpendicular to the longitudinal axis of the heat exchanger or, respectively, the cryogenic container and pointing towards the vehicle frame.

Furthermore, the system preferably comprises a control unit which is connected to at least one valve, preferably to all valves, of the pressure management valve block, the control unit being designed for controlling the mass flow of the cryogenic fluid recirculated via the internal heat exchanger and/or, optionally, for controlling the mass flow via one of the bypass lines. The control of the valves could indeed also occur manually in some cases, but a control unit is preferred. The control unit can actuate the valves in such a way that they will assume the function of the pressure management system. For example, the proportion of cryogenic fluid guided into the internal heat exchanger is increased, if the pressure in the cryogenic container is to be increased. The control of the mass flow via the bypass line occurs with the aim of temporarily reducing the pressure losses caused by the heat exchangers, e.g., if the heat exchange medium supplied to the heat exchanger is too warm and, as a result, the cryogenic fluid is heated to an undue degree or in order to compensate for a pressure in the cryogenic container that is too low, which could be due to misfuelling.

In the aforementioned embodiment, it is particularly preferred if the system comprises at least one sensor which is preferably inserted into a sensor recess of the pressure management valve block or of an economizer valve block, the control unit being designed for controlling the valve or valves depending on a measured value supplied by the sensor. If the sensors are also accommodated in the corresponding valve blocks, a particularly compact system is made possible.

Advantageous and non-limiting embodiments of the invention are explained in further detail below with reference to the drawings.

Figure 1:
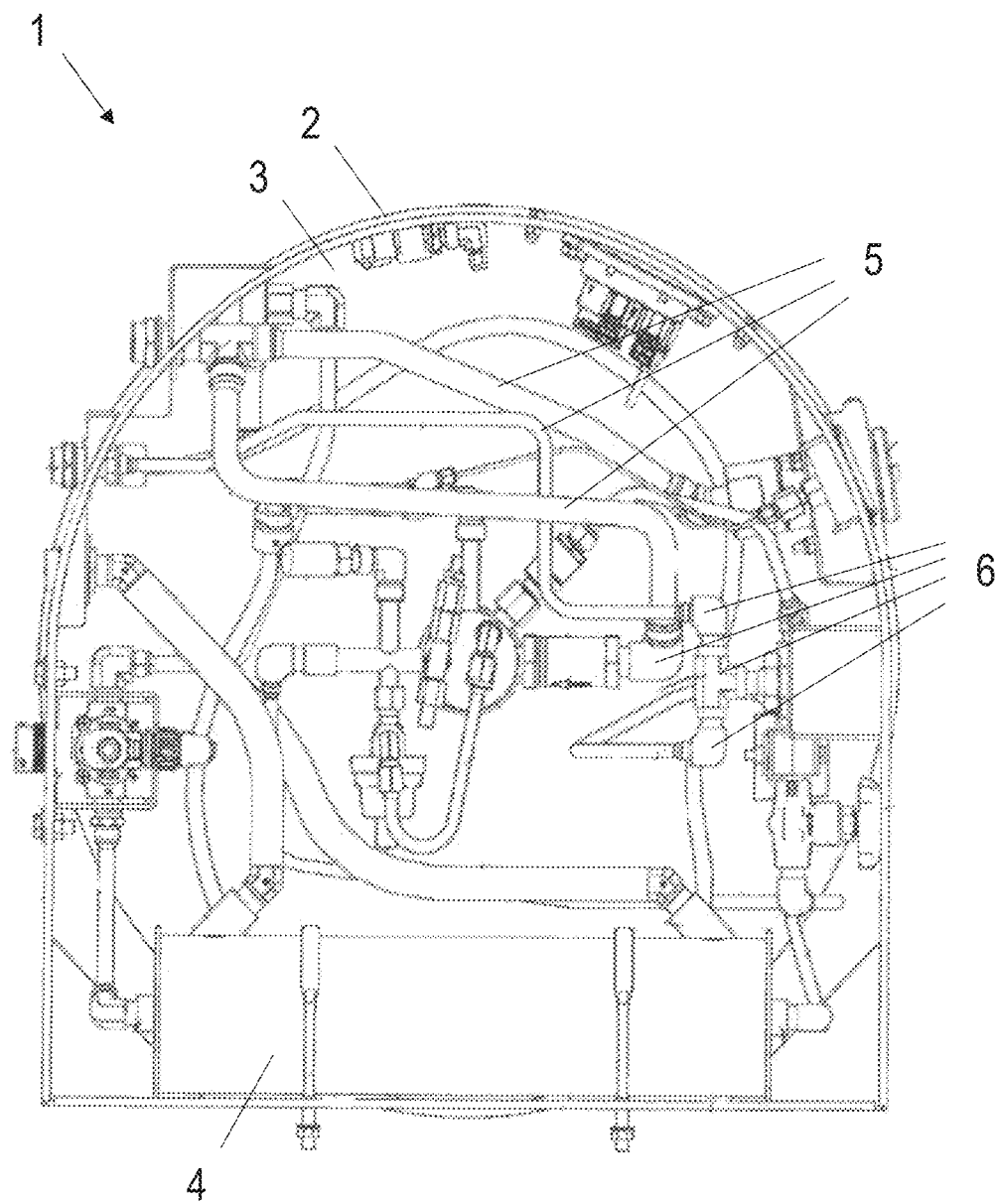
FIG. 1 shows a removal system and a filling system of a cryogenic container according to the prior art.

FIG. 1 shows a cryogenic container 1 according to the prior art in a side view. The cryogenic container 1 has a cryogenic container jacket 2 and an end cap 3. In the illustrated example, the cryogenic container jacket 2 is cylindrical, which is only partially visible due to the chosen view. On an end cap 3 of the cryogenic container 1, a removal system is arranged, which comprises, among other things, a heat exchanger 4, several lines 5 and connecting elements 6 of the lines 5. The connecting elements 6 are, for example, T-pieces or angles.

It is clearly visible in FIG. 1 that the lines 5 occupy almost the entire installation space in front of the cryogenic container 1, whereby the cryogenic container 1 has to be designed shorter than what would be basically possible, or whereby further components have to be arranged in other places. In addition, an error-prone sealing connection must be produced at any interface between the line 5 and the connecting element 6.

FIGS. 2-13 now show a system by means of which the required space is reduced and in which there is less susceptibility to errors. Furthermore, with this system, the assembly effort is greatly reduced, the testing effort is decreased, and costs are reduced. Since the cryogenic container 1, the cryogenic container jacket 2 and the end caps 3 thereof, and the heat exchanger 4 can be designed equally or similarly to FIG. 1, the same reference symbols are used.

In the cryogenic container 1 as considered herein, cryogenic fluid is stored in the gaseous state 7 or in the liquid state 8. For example, the cryogenic fluid can be hydrogen so that the cryogenic container 1 is a hydrogen container, or the cryogenic fluid can be LNG (Liquefied Natural Gas) so that the cryogenic container is an LNG container. Depending on the cryogenic fluid, the cryogenic container is thus designed for storing cryogenic fluid at temperatures of, for example, below 150 Kelvin, in case of hydrogen even of below 50 Kelvin or below 30 Kelvin or essentially of 20 Kelvin. Depending on the application, the cryogenic container 1 could be designed, for example, for storing sLH2 (subcooled liquid hydrogen) or CcH2 (cryo-compressed hydrogen) and thus also for corresponding high pressures, for example for maximum pressures of between 5 bar and 350 bar.

The cryogenic container 1 described herein is usually used as a fuel tank of a vehicle (not illustrated any further) and can be mounted for this purpose, for example, on the vehicle frame of the vehicle. For supplying the cryogenic fluid as a fuel to a drive such as, e.g., an engine or a fuel cell of the vehicle, two removal lines 9, 10 are routed into the cryogenic container 1. The first removal line 9 is routed into the area which, in the operating position of the cryogenic container 1, is at the top in order to remove gaseous cryogenic fluid, and the second removal line 10 is routed into the area which, in the operating position of the cryogenic container 1, is at the bottom in order to remove liquid cryogenic fluid. The removal lines 9, 10 pass either through the cryogenic container jacket 2 or through one of the end caps 3 and are thus guided out of the cryogenic container 1.

Figure 4:
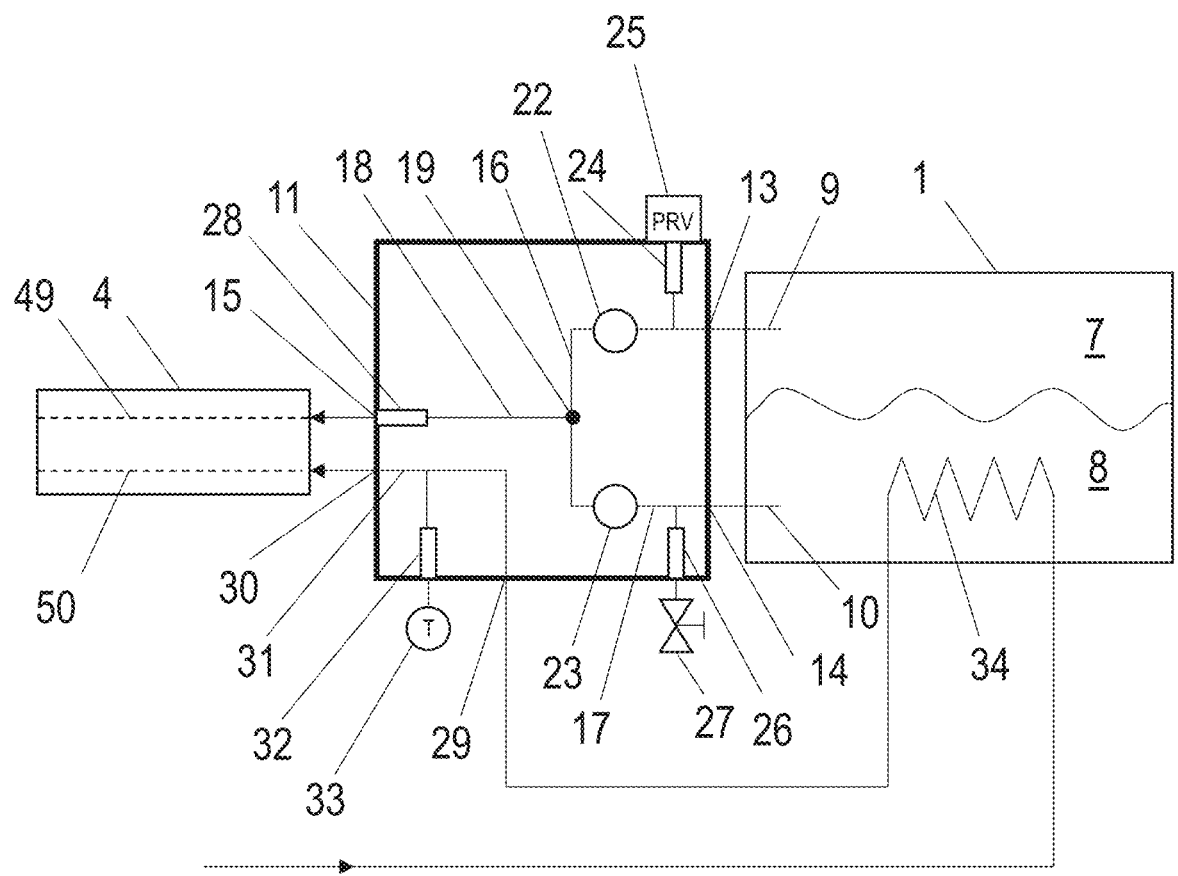
FIG. 4 shows an economizer valve block according to the invention in a second embodiment.
Figure 5:
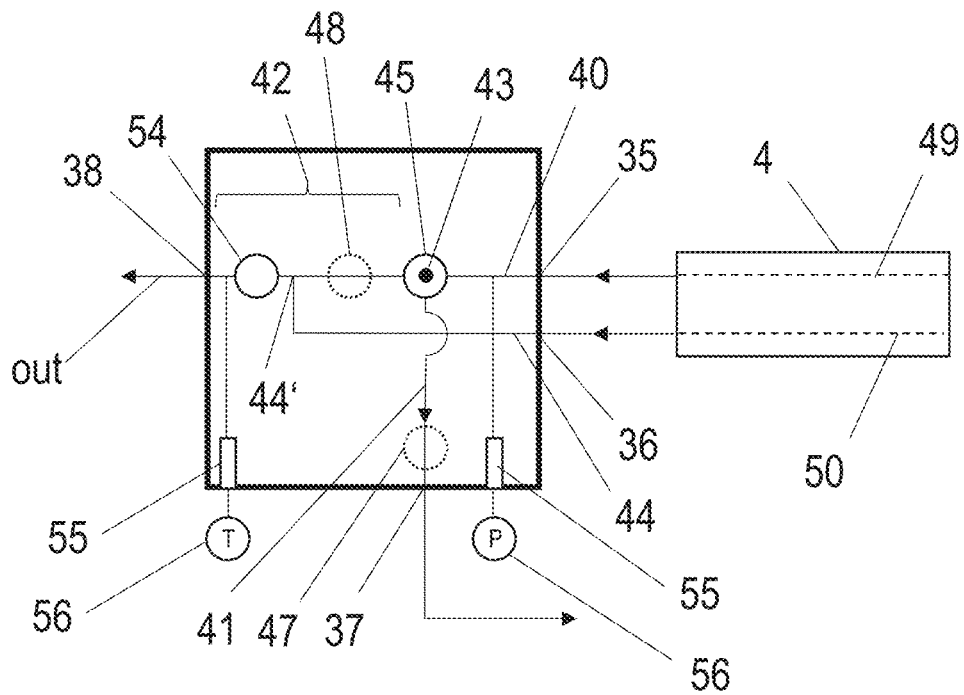
FIG. 5 shows a pressure management valve block according to the invention in a first embodiment.
Figure 6:
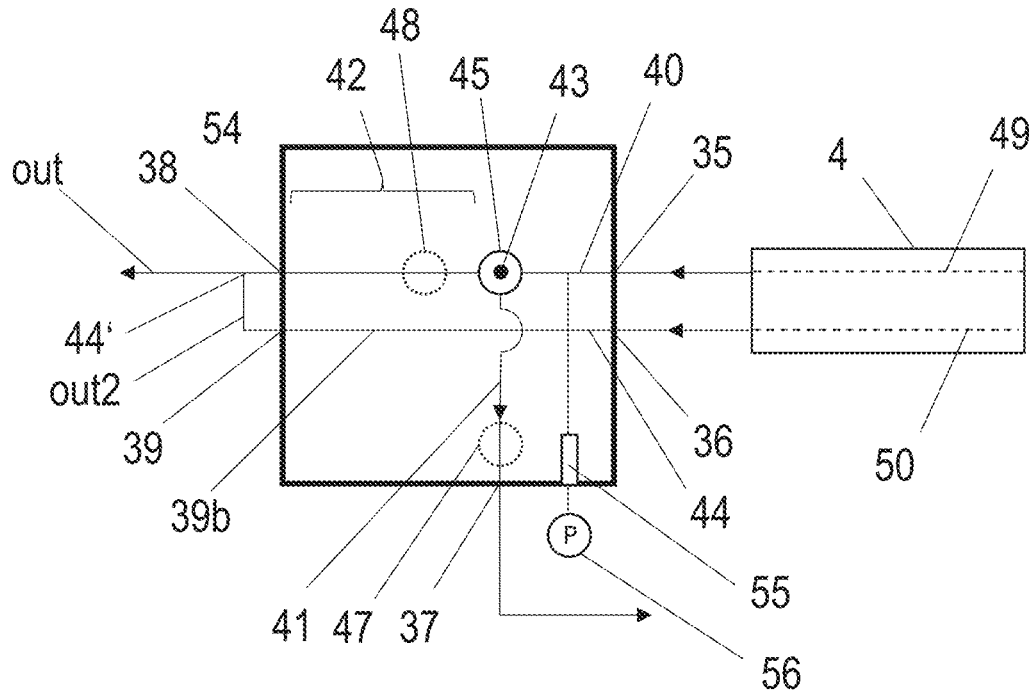
FIG. 6 shows a pressure management valve block according to the invention in a second embodiment.

In order to make sure that no increased space requirement results from lines as shown in FIG. 1, selected components are designed in front of and/or behind the heat exchanger 4, integrated as a so-called economizer valve block 11 (FIGS. 2 to 4) or, respectively, as a so-called pressure management valve block 12 (FIGS. 5 and 6).

The economizer valve block 11 is designed as a single-piece valve block, which, for example, is made of stainless steel, which is particularly preferred if the cryogenic fluid is hydrogen, or is made of brass. The economizer valve block 11 has a first inlet port 13 for the first removal line 9 and a second inlet port 14 for the second removal line 10. Furthermore, the economizer valve block 11 has an outlet port 15 for connection to the heat exchanger 4.

Inside the economizer valve block 11, the first inlet port 13, the second inlet port 14 and the outlet port 15 are connected by a connection passage. The connection passage is composed of a connecting portion on the gas phase side 16, a connecting portion on the liquid phase side 17 and a connecting portion on the end side 18, which converge at a node 19.

The connection passage can have a diameter that corresponds to the inner diameter of the known lines 5 from FIG. 1, wherein the diameter of the connection passage inside the economizer valve block 11 can also vary. For example, the diameters in the connecting portion on the gas phase side 16, in the connecting portion on the liquid phase side 17 and in the connecting portion on the end side 18 can be designed differently. The connection passage can be produced by drilling or, for example, can be produced directly together with the economizer valve block 11 as the latter is being cast. The same applies to the pressure management valve block 12, which will be explained in further detail below.

In order to realize a so-called economizer in the economizer valve block 11, one or several valves is/are provided in the economizer valve block 11 to control the removal ratio of cryogenic fluid in the liquid phase and in the gas phase, whereby, for example, the pressure in the cryogenic container 1 can be actively influenced, without gaseous cryogenic fluid being released into the environment. The mode of operation of an economizer is well known and, therefore, will not be discussed any further herein.

Figure 2:
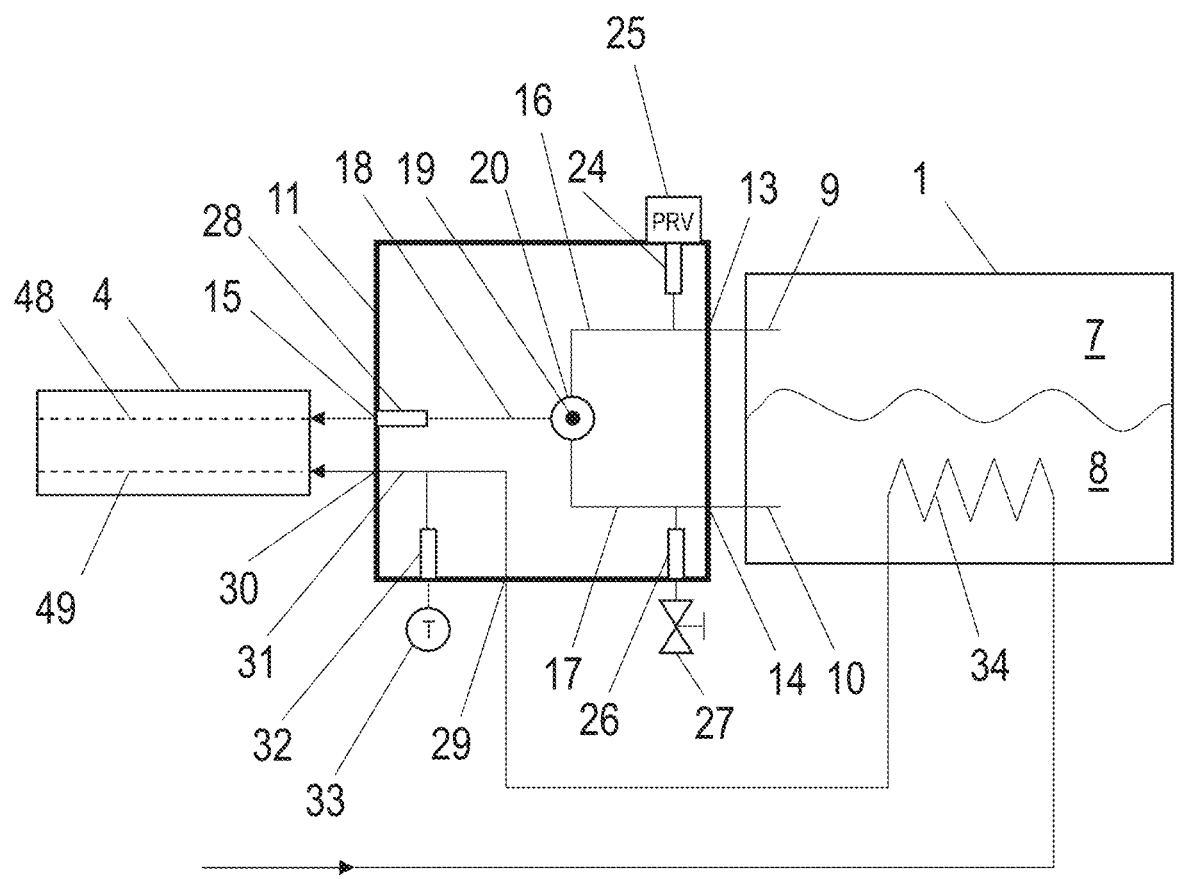
FIG. 2 shows an economizer valve block according to the invention in a first embodiment.

FIG. 2 shows an embodiment in which the economizer valve block 11 has a valve recess 20 that is open towards the outside and starts at the node 19. A valve 21 (FIG. 3) can now be inserted into this valve recess 20 in order to control which proportion of gaseous and liquid cryogenic fluid will reach the connecting portion on the end side 18 and thus the heat exchanger 4. In this embodiment, the valve 21 is designed as a multi-way valve since it determines an aperture ratio between the connecting portion on the gas phase side 16, the connecting portion on the liquid phase side 17 and the connecting portion on the end side 18.

Figure 3:
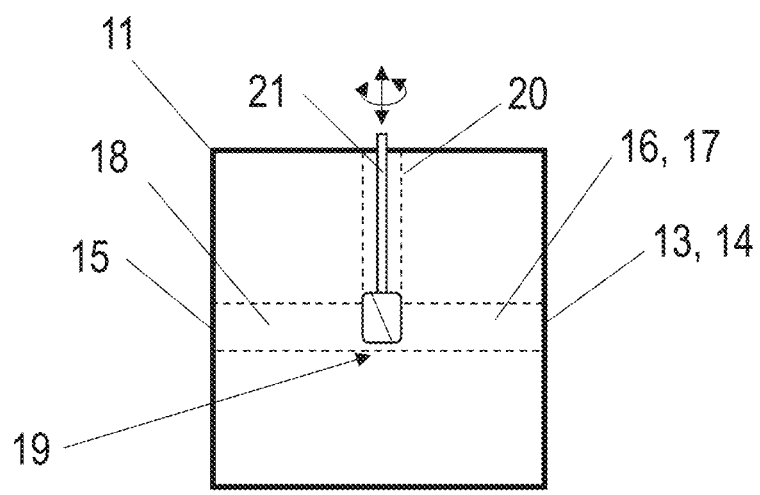
FIG. 3 shows the economizer valve block of FIG. 2 in a side view.

FIG. 3 shows one way in which the valve 21 can adjust the removal ratio. Assuming that FIG. 2 depicts a top view of the economizer valve block 11, FIG. 3 depicts a side view of the economizer valve block 11. In this example, the connection passage between the ports 13, 14, 15 lies essentially in one plane. Through this view, the connecting portion on the gas phase side 16 and the connecting portion on the liquid phase side 17 thus coincide. Perpendicularly to the aforementioned plane, the valve recess 20 passes through the economizer valve block 11 from top to bottom until it reaches the node 19. By rotation or longitudinal displacement—depending on the design—the valve 21 inserted into the valve recess 20 can now control the ratio in which the connecting portion on the gas phase side 16 or, respectively, the connecting portion on the liquid phase side 17 is connected to the connecting portion on the end side 18.

In the simplest case, the valve 21 designed as a multi-way valve only allows three switching states, wherein, in the first switching state, only the connection to the connecting portion on the gas phase side 16 is completely closed, in the second switching state, only the connection to the connecting portion on the liquid phase side 17 is completely closed and, in the third switching state, both the connection to the connecting portion on the gas phase side 16 and that to the connecting portion on the liquid phase side 17 are completely closed.

In other cases, it is possible to design the multi-way valve as a proportional valve in order to selectively throttle the connection to the connecting portion on the gas phase side 16 and the connection to the connecting portion on the liquid phase side 17. As a result, it is possible, for example, to open the connection between the connecting portion on the gas phase side 16 and the connecting portion on the end phase side 18 by X % and, depending on that, to open the connection between the connecting portion on the liquid phase side 17 and the connecting portion on the end phase side 18 by 100-X %, wherein $0 \leq X \leq 100$. Alternatively, the multi-way valve could be designed for opening the connection between the connecting portion on the gas phase side 16 and the connecting portion on the end phase side 18 by between 0-100% and, regardless of that, for opening the connection between the connecting portion on the liquid phase side 17 and the connecting portion on the end phase side 18 by between 0-100%. These different embodiments serve the purpose of minimizing the pressure losses between the cryogenic container and the consumer (the engine). The pressure losses are lost as an unusable pressure interval for the hold time (storage period free from blowing off). At the same time, there is a desire to be able to consciously set pressure differences between certain line paths in certain operating states.

FIG. 4 shows an embodiment in which the economizer valve block 11 has two valve recesses 22, 23 open towards the outside, with the first one starting at the connecting portion on the gas phase side 16 and the second one starting at the connecting portion on the liquid phase side 17. In this embodiment, a first valve (not illustrated) is inserted into the first valve recess 22, and a second valve (not illustrated) is inserted into the second valve recess 23. The first and second valves can each be proportional valves, i.e., they can be opened by between 0-100% interdependently or independently of each other. Alternatively, the valves could only have discrete switching states, e.g., they could only be closed completely or opened completely and, if necessary, they could assume an intermediate position of being, for example, 50% open.

The embodiments of FIGS. 2 to 4 could also be combined, i.e., valve recesses 20, 22, 23 open towards the outside could start at the node 19, at the connecting portion on the gas phase side 16 and at the connecting portion on the liquid phase side 17, with valves being inserted into all three valve recesses and all three valves being controllable separately, for example.

However, as can be seen in FIGS. 2 and 4, the economizer valve block 11 can implement not only the economizer within a single-piece valve block, but even more elements can be integrated within the economizer valve block 11 so that, for example, fewer T-pieces or the like have to be incorporated into the removal lines 9, 10.

As shown in FIG. 2, the economizer valve block 11 can, for example, have a further valve recess 24 open towards the outside and starting at the connecting portion on the gas phase side 16, with a pressure relief valve 25 being connected to the further valve recess 24, being inserted therein, for example. The pressure relief valve 25 serves for releasing gaseous cryogenic fluid from the cryogenic container 1 when the pressure rises therein in order to reduce the risk of damage to the cryogenic container 1. Therefore, it is usually envisaged that the pressure relief valve 25 is attached to the connecting portion on the gas phase side 16 in front of the valve recess 20 or 22, rather than behind the valve recess 20 or 22, since the valve 21 could be closed due to a malfunction, for example, as a result of which the cryogenic container 1 would no longer be connected to the pressure relief valve 25. The pressure relief valve 25 can be inserted directly into the further valve recess 24 or can be connected to the further valve recess 24 by means of a connecting line.

Furthermore, FIG. 2 shows that the economizer valve block 11 can have a connection recess 26 for a drain connection 27, the connection recess 26 being open towards the outside and being connected to the connecting portion on the liquid phase side 17, i.e., a further connection passage is provided which connects the connection recess 26 to the connecting portion on the liquid phase side 17. The drain connection 27 serves for emptying the cryogenic container 1 manually without having to guide the cryogenic fluid through the downstream components such as the heat exchanger 4.

Furthermore, the connecting portion on the end side 18 can have a recess for an overflow valve 28, wherein the recess can be directly adjacent to the outer wall of the economizer valve block 11 to facilitate the introduction of the overflow valve 28. The overflow valve 28 has the function of limiting the maximum flow through the connecting portion on the end side 18 so that cryogenic fluid cannot flow out in an uncontrolled manner if there is a defect in the removal system.

What is particularly relevant and specific for the economizer valve block 11 is that it can also comprise a further inlet port 29 and a further outlet port 30, which are connected by a further connection passage 31, the further connection passage 31 not communicating with the first-mentioned connection passage. This further connection passage 31 has the background that, due to the extremely small installation space that is available, especially in vehicles, only very little space can be provided between the economizer valve block 11 and the heat exchanger 4. Thereby, it would not always be possible, for example, to route a separate, angled line between the economizer valve block 11 and the heat exchanger 4, which, however, is not necessary if the economizer valve block 11 comprises said further connection passage 31. This embodiment is thus particularly preferred if the heat exchanger 4 and the economizer valve block 11 are located at a maximum distance of 10 cm, preferably of 5 cm, particularly preferably of 3 cm, between each other.

Furthermore, the economizer valve block 11 can have one or several sensor recesses 32 for a sensor 33 which are open towards the outside and start at the connecting portion on the gas phase side 16, at the connecting portion on the liquid phase side 17, at the connecting portion on the end side 18 and/or at the further connection passage 31. The sensor is preferably a pressure sensor and/or a temperature sensor and can be connected directly or indirectly via a line to the sensor recess 32. In the example of FIG. 2, the sensor recess 32 is connected to the further connection passage 31, and a sensor 33 designed as a temperature sensor is directly connected to the sensor recess 32. The attachment of a sensor 33 to the further connection passage 31 is particularly preferred since the measurement of the temperature or, respectively, the pressure of a cryogenic fluid recirculated through the further connection passage 31 is of particular relevance, as will be explained more precisely below for the pressure management system.

FIGS. 5 and 6 show that the components connected downstream of the heat exchanger 4 can also be integrated within a single-piece valve block, the so-called pressure management valve block 12. The design of the pressure management valve block 12 is essentially independent of the design of the economizer valve block 11. While the economizer valve block 11 implements an economizer, the pressure management valve block 12 is supposed to integrate a so-called pressure management system within a single single-piece valve block. In a pressure management system, part of the cryogenic fluid is branched off in a generally known manner downstream of the heat exchanger 4 and is fed into a further internal heat exchanger 34 with a third inlet E3 and a third outlet A3, the internal heat exchanger 34 protruding into the cryogenic container 1. The branching off of a partial flow of cryogenic fluid can be effected, for example, by specifically generating a pressure difference between the lines, as described, for example, in WO 2021/026580 A1. The pressure management system is also well known and, therefore, it will not be discussed any further herein.

The heat exchanger 4 shown in FIGS. 5 and 6 essentially corresponds to that of FIGS. 2 and 4. Therefore, cryogenic fluid removed from the cryogenic container 1 first flows through the economizer valve block 11, then through the heat exchanger 4 and then through the pressure management valve block 12.

The pressure management valve block 12 comprises at least a first inlet port 35, a second inlet port 36, a first outlet port 37 and a second outlet port 38. In the embodiment of FIG. 5, all four ports 35, 36, 37, 38 inside the pressure management valve block 12 are interconnected by a connection passage. The second outlet port 38 is connected to an output line out, which can be routed to a consumer, e.g., an engine or a fuel cell, of the vehicle.

In the embodiment of FIG. 6, only the first inlet port 35, the first outlet port 37 and a second outlet port 38 are interconnected by a connection passage. The second inlet port 36 is connected to a third outlet port 39 via a further connection passage 39b not in communication with the aforementioned connection passage. An intermediate line out2 connects to the third outlet port 39, connecting it at a second node 44' to the output line out.

In the two aforementioned embodiments of FIGS. 5 and 6, the connection passage connecting the ports 35, 37 and 38 comprises a first connecting portion on the inlet side 40, a first connecting portion on the outlet side 41 and a second connecting portion on the outlet side 42, which converge at a node 43. The first connecting portion on the inlet side 40 extends between the first inlet port 35 and the node 43, the first connecting portion on the outlet side 41 extends between the first outlet port 37 and the node 43, and the second connecting portion on the outlet side 42 extends between the second outlet port 38 and the node 43. In the embodiment of FIG. 5, the second inlet port 36 within the pressure management valve block 12 is connected via a second connecting portion on the inlet side 44 to the second connecting portion on the outlet side 42 at a second node 44', the second connecting portion on the outlet side 42 extending between the second inlet port 36 and the second node 44' on the second connecting portion on the outlet side 42. The second node 44' is located downstream of the first-mentioned node 43.

For implementing the function of the pressure management system, the pressure management valve block 12 has at least one valve recess 45 open towards the outside, the valve recess 45 starting at the first connecting portion on the outlet side 41, at the second connecting portion on the outlet side 42 or at the node 43.

In FIG. 5, the valve recess 45 starts at the node. A valve 46 is inserted into the valve recess 45 (FIG. 8), which valve is designed, in this embodiment, as a multi-way valve, as illustrated, for example, in FIG. 3, as it determines an aperture ratio between the first connecting portion on the inlet side 40, the first connecting portion on the outlet side 41 and the second connecting portion on the outlet side 42. The valve 46 can be designed in the same way as described above for the valve 21.

Alternatively or additionally, it can be envisaged that further valve recesses 47, 48 are designed on the first connecting portion on the outlet side 41 and/or on the second connecting portion on the outlet side 42. In this embodiment, a first valve (not illustrated) can be inserted into the valve recess 47, and a second valve (not illustrated) can be inserted into the valve recess 48. However, in this case, it is also possible to insert a rigid throttle into one of the valve recesses 47, 48.

The mode of operation of the pressure management system implemented in the pressure management valve block 12 will now be explained with reference to FIG. 7, in which the embodiments of FIGS. 2 and 5 are combined. However, it will be appreciated that any of the other embodiments could also be combined to achieve the function, even without an economizer, i.e., without an economizer valve 11.

According to FIG. 7, cryogenic fluid removed via the removal lines 9, 10 is guided through the economizer valve block 11 and is then supplied to the heat exchanger 4, which, for this purpose, comprises an internal first heat exchanger tube 49 with a first inlet E1 and a first outlet A1, with heat exchange medium being flushed around said tube, as will be explained in further detail below. As a result, the cryogenic fluid is heated and, if necessary, brought into a gaseous state. If the temperature conditions or, respectively, the pressure conditions of the cryogenic fluid are suitable for supply to the engine and the pressure in the cryogenic container 1 corresponds to a normal pressure, the valve(s) 46 in the valve recesses 45, 47, 48 can shut off the first connecting portion on the outlet side 41 so that the entire cryogenic fluid introduced into the first connecting portion on the inlet side 40 is supplied to the second connecting portion on the outlet side 42.

However, if it is desired to increase the pressure in the cryogenic container 1 and/or to influence the temperature of the gas supplied to the engine, the valve(s) 46 is/are adjusted such that at least part of the cryogenic fluid is taken from the connecting portion on the inlet side 40 to the first connecting portion on the outlet side 41. On this path, the cryogenic fluid is guided through the internal heat exchanger 34, whereby the pressure in the cryogenic container 1 rises. Thereupon, the cryogenic fluid is optionally guided through a second heat exchanger tube 50 of the heat exchanger 4 so as to be heated again. The cryogenic fluid is then introduced into the second inlet port 36 of the pressure management valve block 12. The second heat exchanger tube 50 has a second inlet E2 and a second outlet A2, and usually the same heat exchange medium as with the first heat exchanger tube 49 is flushed around it. Depending on the embodiment, a heat exchange medium different from that of the first heat exchanger tube 49 can also be flushed around the second heat exchanger tube 50 so that two separate external heat exchangers will, in fact, be provided, which, however, are collectively referred to as the external heat exchanger 4 to facilitate consideration.

Figure 8:
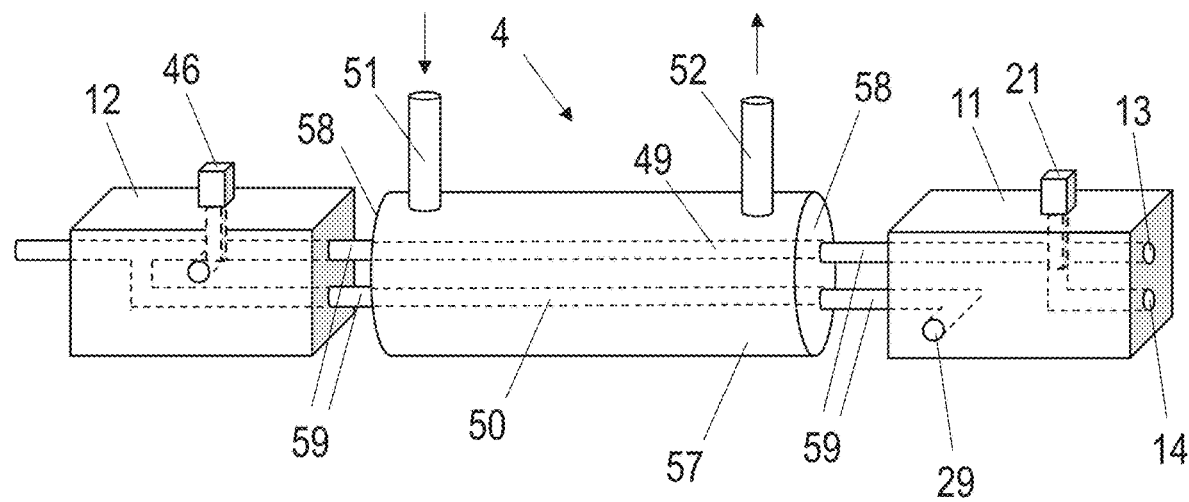
FIG. 8 shows an arrangement according to the invention with a heat exchanger, an economizer valve block and a pressure management valve block in a first embodiment.

The heat exchanger 4 thus has two independent heat exchange paths through the two separate heat exchanger tubes around which heat exchange medium is flushed respectively, the heat exchange medium being introduced into the heat exchanger 4 via a medium inlet 51 and being discharged therefrom via a medium outlet 52 (FIG. 8). The heat exchange medium can be, for example, air, gas, water or oil, with the heat of the heat exchange medium preferably being generated from the waste heat of the engine.

In a further embodiment, however, it could also be envisaged that the heat exchanger 4 comprises only the first heat exchanger tube 49 if an output line is routed from the internal heat exchanger 34 directly to the second inlet port 36 of the pressure management valve block 12.

The pressure management valve block 12, like the economizer valve block 11, can also implement additional functions. In particular, the pressure management valve block 12 can have a further valve recess 54 open towards the outside and starting at the second connecting portion on the end side 42, with a shut-off valve (not illustrated) being inserted into the further valve recess 54, which shut-off valve is actuated, for example, via a control unit and can be closed by said unit in case of an emergency.

Furthermore, the pressure management valve block 12 can have one or several sensor recesses 55 for sensors 56, the sensor recesses being open towards the outside and starting at the first connecting portion on the inlet side 40, at the second connecting portion on the inlet side 44, at the first connecting portion on the outlet side 41 and/or at the second connection passage on the outlet side 42. The sensor is preferably a pressure sensor and/or a temperature sensor and can be connected directly or indirectly via a line to the sensor recess 55. In the example of FIG. 5, a first sensor recess 55 is connected to the first connection passage on the inlet side 40, and a sensor 56 designed as a pressure sensor is directly attached to the sensor recess 55. Furthermore, a second sensor recess 55 is connected to the second connection passage on the outlet side 42, and a sensor 56 designed as a temperature sensor is directly attached to the sensor recess 55.

Figure 7:
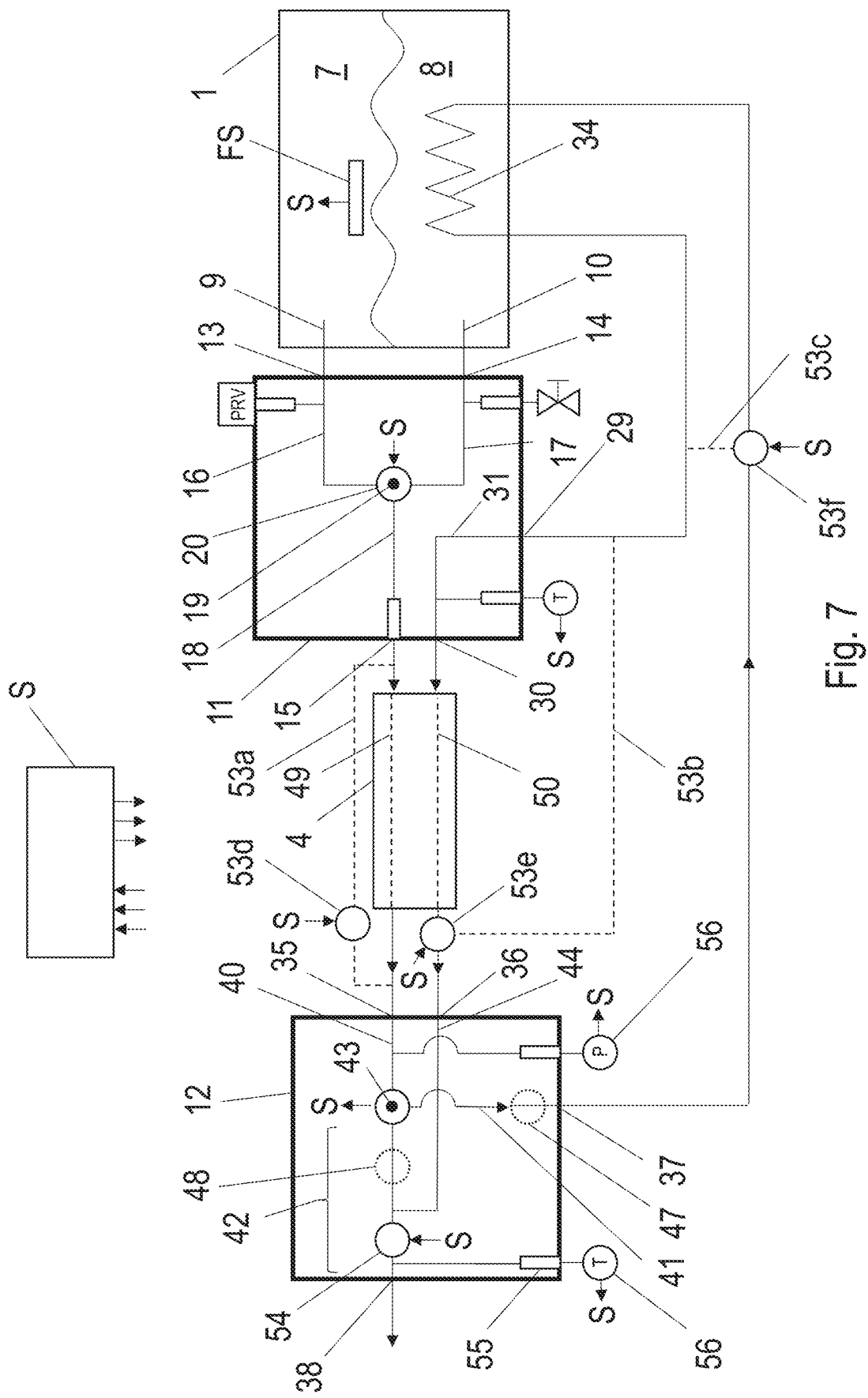
FIG. 7 shows a removal system comprising the economizer valve block according to the invention and the pressure management valve block according to the invention.

Furthermore, it is evident from FIG. 7 that the system can comprise a control unit S, which can receive measured values from the sensors 33, 56 and from a fill-level sensor FS in the cryogenic container 1 and, as a function thereof, can actuate the valves 21, 46 or, respectively, the other valves located in the described valve recesses. In FIG. 7, control lines between the control unit S and the sensors or, respectively, the valves are indicated by arrows in combination with the reference symbol S. The control unit S is not limited to the overall combination, but can also control only the economizer or only the pressure management or, respectively, individual valves thereof.

With reference to FIGS. 8 to 13, the arrangement of the economizer valve block 11 or, respectively, of the pressure management valve block 12 in relation to the heat exchanger 4 will now be explained. Unless explicitly described, it is not mandatory that the arrangement of the economizer valve block 11 must be provided only in connection with the pressure management valve block 12, or vice versa.

Figure 9:
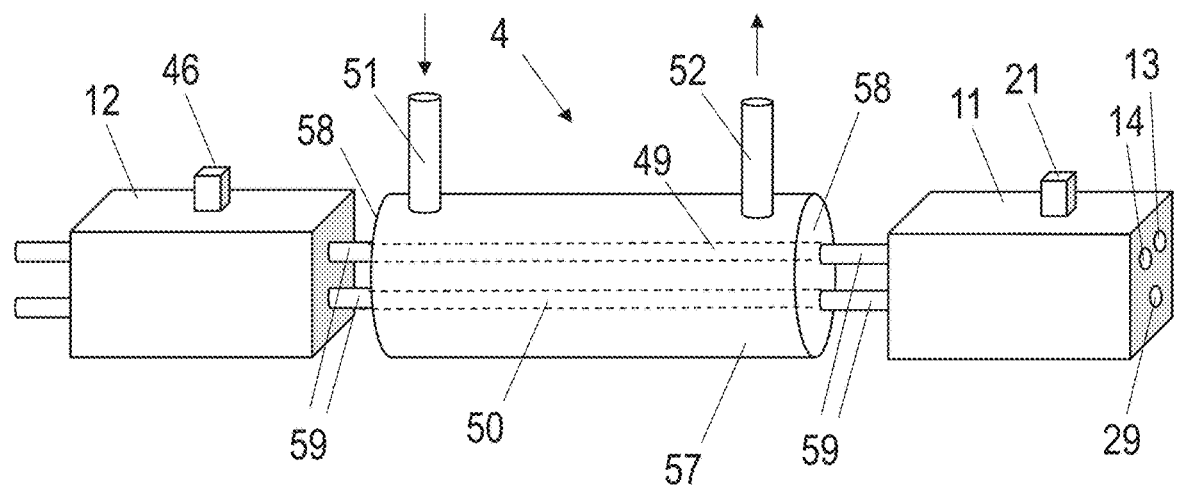
FIG. 9 shows an arrangement according to the invention with a heat exchanger, an economizer valve block and a pressure management valve block in a second embodiment.

It is evident from FIGS. 8 to 13 that the heat exchanger 4 can be essentially rod-shaped. In FIGS. 8 and 9, the heat exchanger 4 comprises, for example, a jacket 57 and two lateral surfaces 58. Such heat exchangers are known per se from the prior art. The jacket 57 is usually cylindrical, but can also assume a different shape and can be adapted, for example, to the shape of the cryogenic container in order to be placed, for example, flatly on the generated surface of the cryogenic container 1. The lateral surfaces 58 are usually flat plates. The connection openings of the heat exchanger 4 for the heat exchanger tubes 49, 50 are usually located in the lateral surfaces 58, and the medium inlet 51 and the medium outlet 52 are usually located in the jacket 57. The jacket 57 and the lateral surfaces 58 thus enclose a space in which the heat exchanger tube(s) 49, 50 is/are located, whereby this space is normally accessible only via the medium inlet 51 or, respectively, the medium outlet 52.

As illustrated in FIGS. 8 and 9, the economizer valve block 11 and the pressure management valve block 12, or at least one of them, can be arranged in an extension of the rod shape of the heat exchanger 4, i.e., one valve block 11, 12 each next to one of the lateral surfaces 58, resulting in a linear arrangement with the heat exchanger 4 in the middle. As a result, the arrangement can be chosen to be particularly slim, whereby the available installation space (see, for example, FIG. 13) can be utilized particularly efficiently and the pressure losses from the cryogenic container to the consumer (engine, fuel cell) can be minimized. In this case, the lateral surfaces 58 of the heat exchanger 4 are preferably located in parallel to one of the lateral surfaces of the economizer valve block 11 and/or of the pressure management valve block 12.

In the embodiment of FIG. 8, some of the connection openings—as indicated in FIGS. 2 to 7—are located on one side of the respective valve block 11, 12, and other connection openings are located on another side that is normal thereto. For laying the connecting lines as efficiently as possible, all openings can be arranged, as in FIG. 9, on one side of the respective valve block 11, 12, either facing the heat exchanger 4 or facing away from it. The direction of the outlets, e.g., in the valve blocks 11, 12, can also just be arranged in such a way that they are located, for example, at right angles to the longitudinal axis of the heat exchanger 4 in order to allow the cryogenic container to be easily linked to the vehicle, whereby, for example, a 90° elbow piece can be omitted.

Furthermore, FIGS. 8 and 9 show that the valve blocks 11, 12 can be essentially rectangular and the heat exchanger 4 can be essentially cylindrical. However, the valve blocks 11, 12 and the heat exchanger 4 preferably have a shape in cross-section essentially equal to a longitudinal axis of the heat exchanger 4 so that they can be arranged congruently.

It is evident from FIGS. 8 and 9 that the valve blocks 11, 12 are not directly attached to the cryogenic container 1, but that connecting lines 59 can be arranged therebetween. The connecting lines 59 preferably have a length of a maximum of 20 cm, preferably of a maximum of 10 cm, particularly preferably of a maximum of 5 cm. In other embodiments (not illustrated), the valve blocks 11, 12 or, respectively, at least one of the valve blocks 11, 12 can be directly attached to the heat exchanger 4. For example, the lateral surface 58 can have appropriate connecting pieces which are pushed into the respective opening of the respective valve block 11, 12, whereupon a fluid-tight connection can be produced, for example, by soldering. The distance between the heat exchanger 4 and the respective valve block 11, 12 can thus be reduced, if necessary, it can be reduced to essentially 0 cm.

Figure 10:
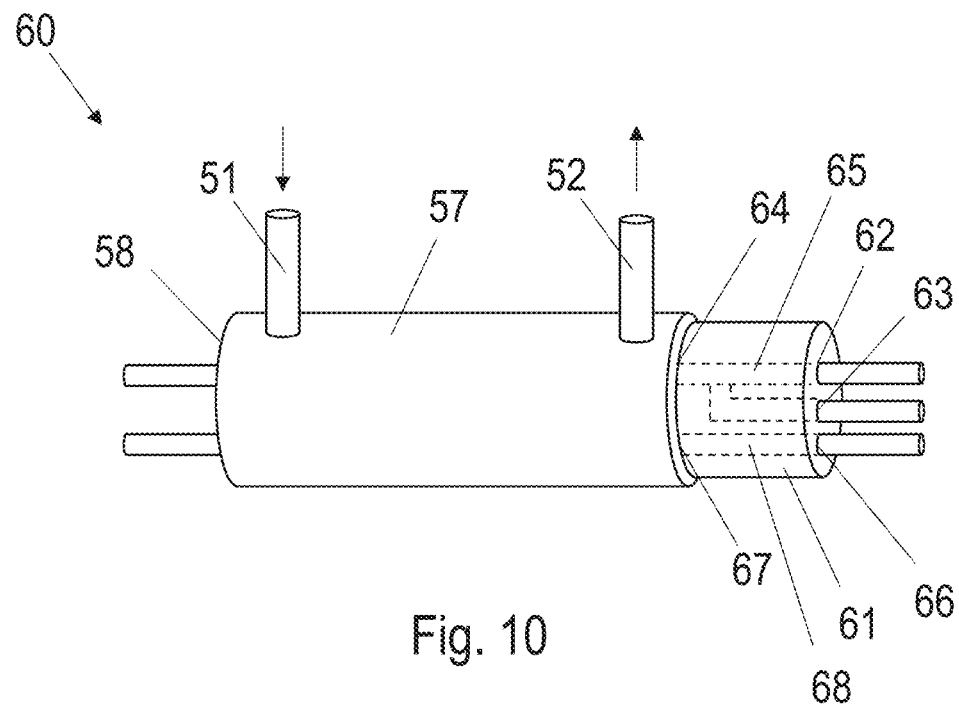
FIG. 10 shows a heat exchanger with an integrated connection block.

FIG. 10 shows a particularly space-saving embodiment for a novel heat exchanger 60 in which one lateral surface is formed by a connection block 61. The other lateral surface can be formed as a flat plate like the lateral surface 58 of the known heat exchanger 4. The heat exchanger 60 thus comprises a connection block 61, a jacket 57 and a flat plate. The jacket 57 is connected to the connection block 61 in a fluid-tight manner, welded to it, for example. The connection block 61 can be provided at the inlet end or the outlet end of the heat exchanger 60. Alternatively, the heat exchanger 60 can also have a connection block 61 on either side, which are connected to the jacket 57 in a fluid-tight manner.

The connection block 61 is designed as a single-piece connection block which has at least two outer openings 62, 63 for cryogenic fluid and at least one inner opening 64 for cryogenic fluid, which are connected inside the single-piece connection block 61 by a connection passage 65. The outer openings 62, 63 are accessible from the outside, e.g., for the at least indirect (via valves, etc.) connection of the removal lines 9, 10 when the connection block 61 faces the cryogenic container 1 in the removal direction, or for the connection of a line routed to the engine or, respectively, of a line routed to the inner heat exchanger 34. The inner opening 64 is connected to the first heat exchanger tube 49.

In the simplest case, the connection block 61 can thus form a T-piece. However, the connection block 61 can also have at least one further outer opening 66 and at least one further inner opening 67, which are connected inside the single-piece connection block 61 by a further connection passage 68, the first-mentioned connection passage 65 and the further connection passage 68 not being in communication.

Therefore, the connection block 61 does not have to exhibit a valve recess open towards the outside or, respectively, does not have to be able to accommodate a valve. If it does so anyway, it is typically referred to as a valve block and can be designed like the economizer valve block 11 described above or like the pressure management valve block 12. If the connection block 61 forms the economizer valve block 11, the outer openings 62, 63 correspond to the first and second inlet ports 13, 14, respectively, and the inner opening 64 corresponds to the outlet port 15. If the connection block 61 forms the pressure management valve block 12, the outer openings 62, 63 correspond to the first and second outlet ports 37, 38, respectively, and the inner opening 64 corresponds to the inlet port 35.

Figure 11:
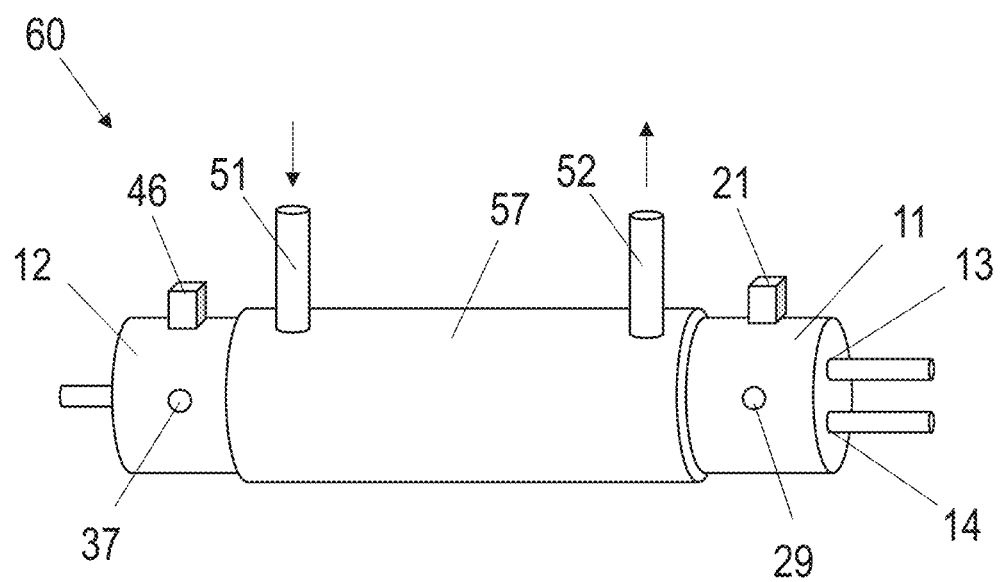
FIG. 11 shows a heat exchanger with an integrated pressure management valve block and an integrated economizer valve block in a first embodiment.
Figure 12:
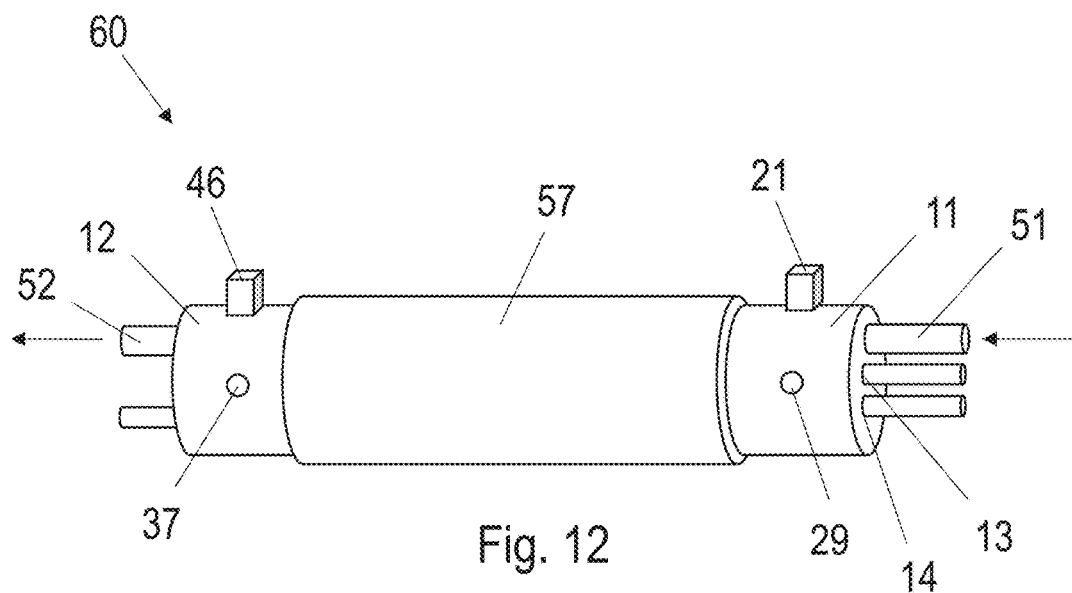
FIG. 12 shows a heat exchanger with an integrated pressure management valve block and an integrated economizer valve block in a second embodiment.

The heat exchanger 60 preferably has the above-described economizer valve block 11 at one end and the above-described pressure management valve block 12 at the other end, with these valve blocks being connected by the jacket 57. A corresponding embodiment is illustrated in FIG. 11. The heat exchanger tube(s) 49, 50 can then be routed within the jacket 57, and heat exchange medium can be flushed around them. Even if the heat exchanger tubes 49, 50 are depicted as straight tubes in the figures for better clarity, they are usually designed as spiral tubes so as to offer a larger surface area for heat transfer. The first heat exchanger tube 49 can be connected to the outlet port 15 of the economizer valve block 11 and to the first inlet port 35 of the pressure management valve block 12. The second heat exchanger tube 50 can be connected to the further outlet port 30 of the economizer valve block 11 and to the second inlet port 36 of the pressure management valve block 12.

For connecting the jacket 57 to the connection block(s) 61 in a fluid-tight manner, the jacket 57 preferably has at its ends an inner contour which corresponds to the outer contour of the respective connection block 61 at the connecting point to the jacket 57. As a result, the jacket 57 can be guided over the connection block 61, and the jacket 57 can be fastened to the connection block 61 in a fluid-tight manner, with a circumferential weld seam, for example. This is illustrated in FIGS. 10 to 13.

At least at one end, the jacket 57 can alternatively also have an outer contour which corresponds to or is smaller than the outer contour of the respective connection block 61. In this case, too, a circumferential weld seam can be used for connecting the jacket 57 to the connection block(s) 61.

According to FIGS. 10 and 11, the heat exchanger 60 has a medium inlet 51 and a medium inlet 52 on the jacket 57. However, according to FIG. 12, it can also be envisaged that the medium inlet 51 and/or the medium outlet 52 is/are provided in the connection block 61. For example, one of the connection blocks 61 can have both the medium inlet 51 and the medium outlet 52, or one of the connection blocks 61 can have the medium inlet 51 and the other one of the connection blocks 61 can have the medium outlet 52. Also, the medium inlet 51 or, respectively, the medium outlet 52 could be arranged in the jacket 57, and the corresponding other medium outlet 52 or medium inlet 51 could be arranged in the connection block 61. If this is envisaged for the economizer valve block 11 or, respectively, for the pressure management valve block 12, the corresponding valve block will have an additional connection passage not connected to the other connection passages. Moreover, this could also be envisaged if a conventional heat exchanger, as in FIGS. 8 and 9, is used, wherein connecting lines for the heat exchange medium can optionally be provided between the valve block 11, 12 and the heat exchange medium.

Figure 13:
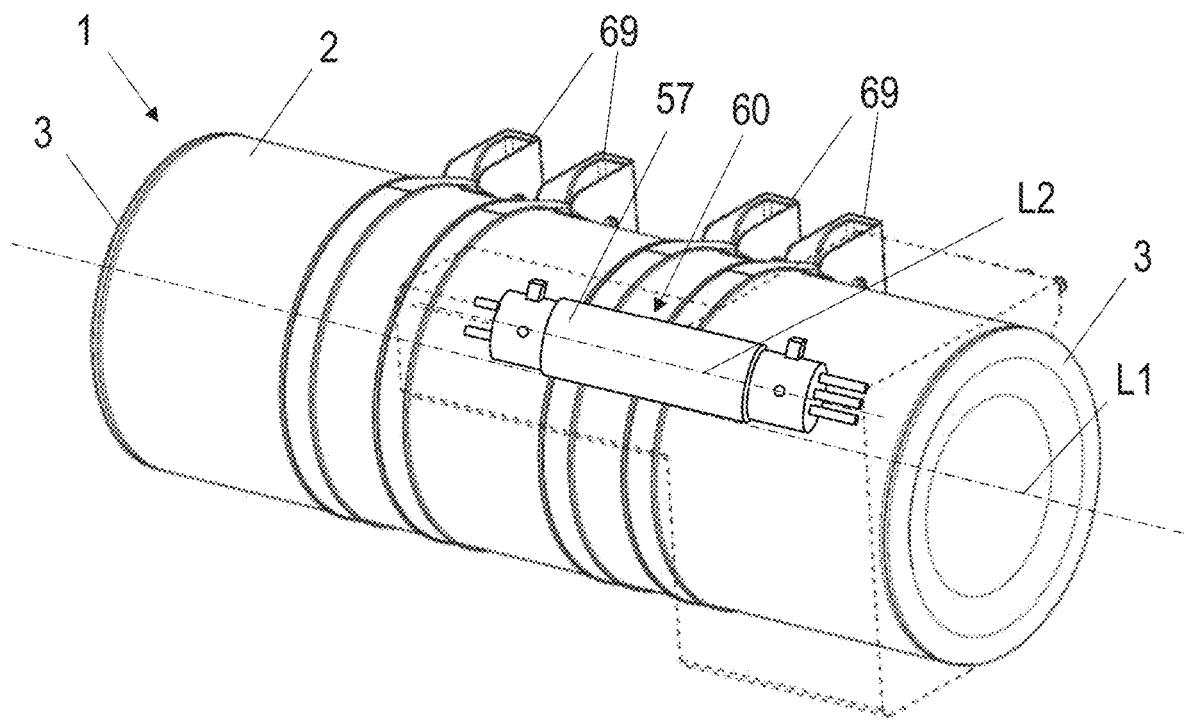
FIG. 13 shows the arrangement of the heat exchanger of FIG. 12 on a cryogenic container.

In principle, the heat exchanger 60 with the connection block 61 can also be arranged on an end cap 3 of the cryogenic container 1, for example in a position as shown in FIG. 1. However, as shown in FIG. 13, it makes sense, in particular, to arrange the heat exchanger 60 essentially in parallel to the cryogenic container 1 or the cryogenic container jacket 2 thereof, i.e., a longitudinal axis L1 of the cryogenic container 1 is located in parallel to a longitudinal axis L2 of the heat exchanger 60. If the cryogenic container 1 is mounted on a vehicle frame of the vehicle by means of supporting brackets 69, the heat exchanger 60 is located on the upper half of the cryogenic container 1 and faces away from the vehicle frame. Alternatively, the heat exchanger 60 can also be located on the side facing the vehicle frame so as not to be exposed to a direct impact, possibly in case of an accident.

The heat exchanger 60 is located, for example, directly adjacent to the cryogenic container jacket 2 or at a distance from it and is located at least partially between the end caps 3, whereby it can also protrude beyond one of the end caps 3, particularly if they have a convex design. Particularly preferably, the heat exchanger 60 is located at least partially, preferably completely, within a smallest possible imaginary cuboid that circumscribes the cryogenic container 1.

Figure 14:
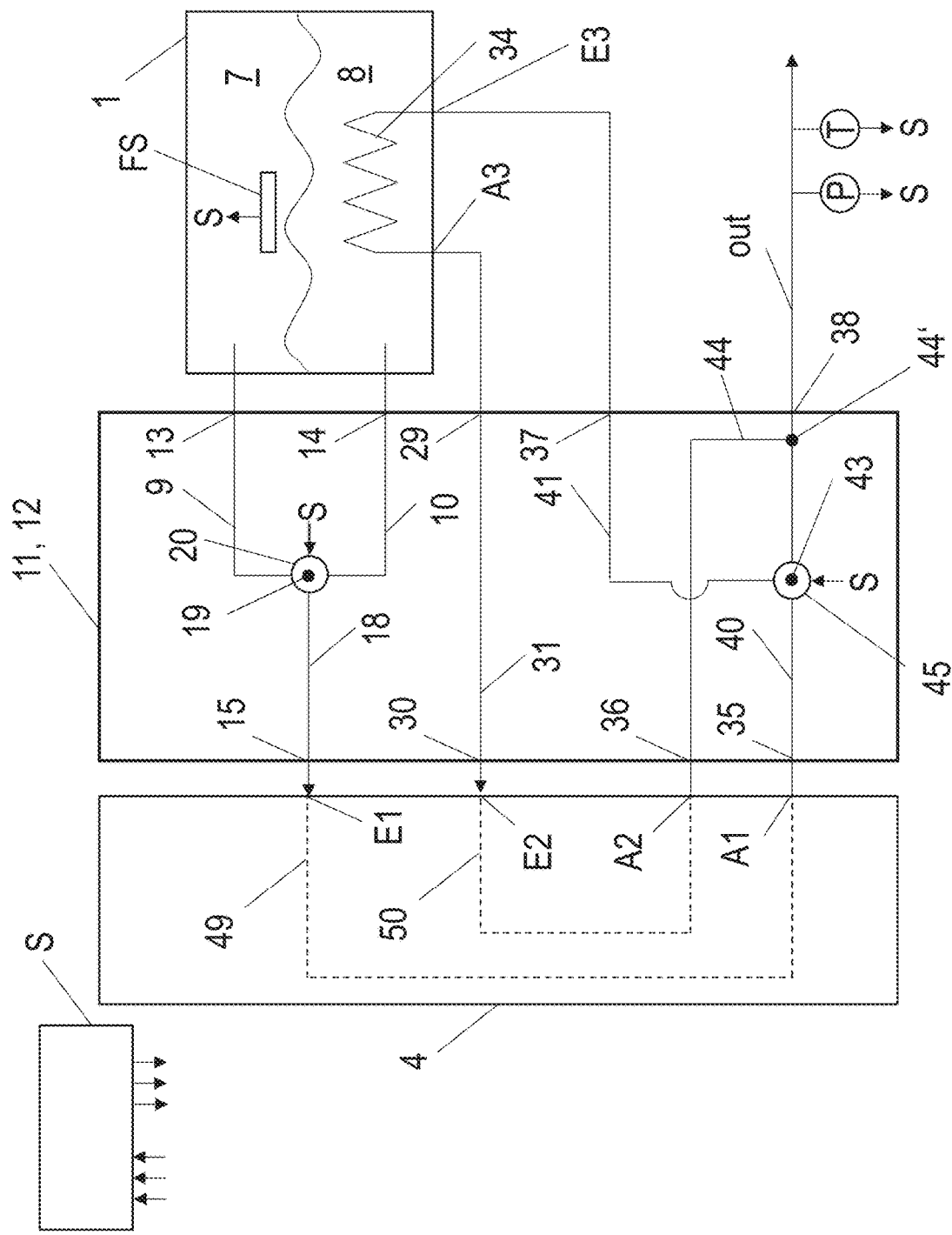
FIG. 14 shows an embodiment in which the economizer valve block and the pressure management valve block are designed together in one valve block.

FIG. 14 shows an embodiment in which a valve block 11, 12 is used, wherein the features of the economizer valve block 11 and the pressure management valve block 12 are combined. It is thus a valve block 11, 12 which has an inlet port 13 for a line for the removal of cryogenic fluid in the gas phase, an inlet port 14 for a line for the removal of cryogenic fluid in the liquid phase, an inlet port 29 for connection to the outlet A3 of the internal heat exchanger 34, an outlet port 37 for connection to the inlet E3 of the internal heat exchanger 34 and an outlet port 38 for the output line out. All these ports can, but do not have to, be arranged on a common side of the valve block 11, 12. Furthermore, the valve block 11, 12 has an outlet port 15 for the inlet opening E1 of the first heat exchanger tube 49, an inlet port 35 for the outlet opening A1 of the first heat exchanger tube 49, an outlet port 30 for the inlet opening E2 of the second heat exchanger tube 50 and an inlet port 36 for the outlet opening A2 of the second heat exchanger tube 50. Furthermore, the valve block 11, 12 can comprise inlet ports and outlet ports for heat exchange medium (not illustrated). The connection passages, the valve recesses and the optional embodiments are feasible as described for FIGS. 2 to 7.

Figure 15:
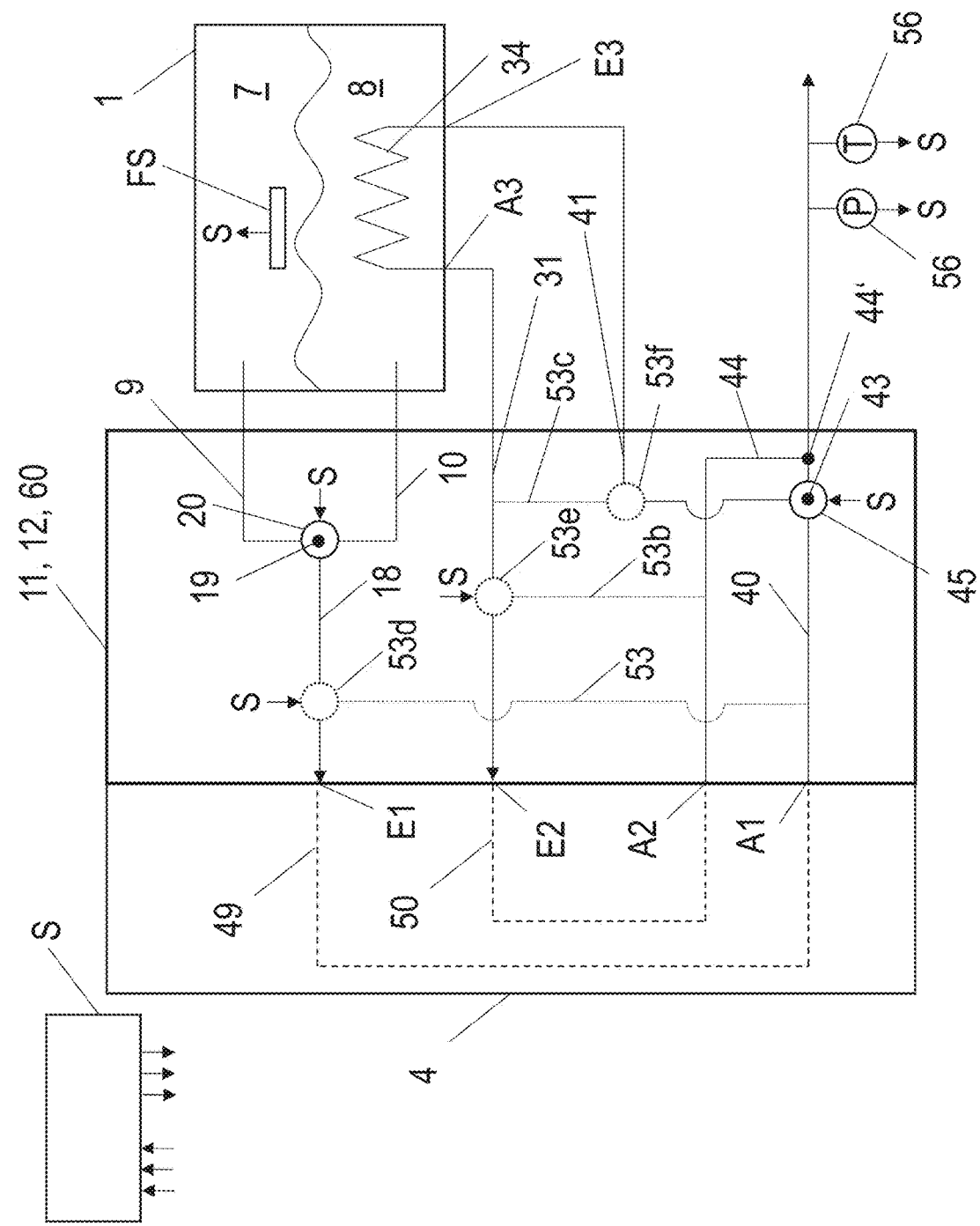
FIG. 15 shows a variant of FIG. 14 with bypass lines within the valve block.

As shown in FIG. 15, the valve block 11, 12 and the external heat exchanger 4 can be spaced apart from each other and connected by means of intermediate lines. As shown in FIG. 15, it would alternatively be possible to mount the valve block 11, 12 directly and without any intermediate lines on the external heat exchanger 4 or, respectively, to integrate the valve block 11, 12 as a side wall in the heat exchanger, as described with regard to FIGS. 10 to 13.

Turning back to FIG. 7, it is shown that, for connecting the heat exchanger tubes 49, 50 or, respectively, the internal heat exchanger 34 in parallel, bypass lines 53a, 53b, 53c can be provided as follows:

a first bypass line 53a for the first heat exchanger tube 49, the first bypass line 53a connecting upstream of the first inlet E1 of the first heat exchanger tube 49 to the connecting portion on the end side 18 or to a line emanating from the first inlet E1 and connecting downstream of the first outlet A1 of the first heat exchanger tube 49 to the first connecting portion on the inlet side 40 or to a line emanating from the first outlet A1;

a second bypass line 53b for the second heat exchanger tube 50, the second bypass line 53b connecting upstream of the second inlet E2 to the further connection passage 31 or to a line emanating from the second inlet E2 and connecting downstream of the second outlet A2 to the second connecting portion on the inlet side 44 or to a line emanating from the second outlet A2;

a third bypass line 53c for the internal heat exchanger 34, the third bypass line 53c connecting upstream of the third inlet E3 to the first connecting portion on the outlet side 41 or to a line emanating from the third inlet E3 and connecting downstream of the third outlet A3 to the further connection passage 31 or to a line emanating from the third outlet A3.

In the bypass lines 53a, 53b, 53c, valves 53d, 53e, 53f can be arranged which are optionally inserted into valve recesses in the valve blocks 11, 12. The valves 53d, 53e, 53f can be designed as 2/2-way valves in the bypass lines 53a, 53b, 53c, as illustrated for the valve 53d, or as a multi-way valve at the front or rear connection point to the respective line or to the respective connection passage, as illustrated for the valves 53c, 53f. The valves 53d, 53c, 53f are preferably connected to the control unit S or can be operated manually. Especially in this embodiment, the control unit S can be connected to at least one sensor for determining pressure readings and/or temperature readings, wherein the sensor is arranged, as explained above, in the cryogenic container 1, in one of the valve blocks 11, 12 or in a line connected thereto, in particular in the output line out, the control unit S being designed for controlling a mass flow of cryogenic fluid through the first, second and/or third bypass line 53a, 53b, 53c, depending on the pressure readings and/or temperature readings received from the sensor, for example, by the valves 53d, 53e, 53f being actuated accordingly.

The control unit S can be designed for receiving or determining a temperature downstream of the second node 44', a pressure downstream of the second node 44' and a pressure in the cryogenic container 1 and for controlling a mass flow via the second connecting portion on the inlet side 44, the first, the second and/or the third bypass line 53a, 53b, 53c under the conditions that the temperature downstream of the second node 44' or, respectively, in the output line out is at or above a predetermined minimum temperature, the pressure downstream of the second node 44' or, respectively, in the output line out is at or above a predetermined minimum pressure and the pressure in the cryogenic container 1 is minimized. For this purpose, the control unit S can:

increase the mass flow through the first bypass line 53a or the second bypass line 53b when the temperature downstream of the second node 44' is above a predetermined threshold;

increase the mass flow through the third bypass line 53c when the temperature downstream of the second node 44' is below a predetermined threshold;

increase the mass flow of cryogenic fluid via the first bypass line 53a when the pressure in the cryogenic container 1 or downstream of the second node 44' is below a predetermined threshold, the control unit S preferably being designed for relaxing or suspending a condition regarding a required minimum temperature of the consumer.

In particular, the start of the consumer can also be optimized with the bypass lines 53a, 53b, 53c, since the temperature of the heat exchange medium will change after the start of the consumer, i.e., the heat exchange medium is provided at a first temperature at the onset of an operation and, after a predetermined period of time upon the onset of the operation, the heat exchange medium is provided at a second temperature which is higher than the first temperature. The external heat exchanger 4 can be designed for bringing the cryogenic fluid at least to the predetermined minimum temperature of the consumer at the onset of the operation when the cryogenic fluid is being passed through the first heat exchanger tube 49 once, and the control unit S can be designed so as not to guide any mass flow of cryogenic fluid via the first bypass line 53a and/or the second bypass line 53b at the onset of the operation and for guiding a mass flow of cryogenic fluid via the first bypass line 53a and/or the second bypass line 53b after the predetermined period of time, optionally under the condition that the temperature downstream of the second node is at a predetermined minimum temperature. Alternatively, the external heat exchanger 4 can be designed for bringing the cryogenic fluid only to a temperature which is below the predetermined minimum temperature of a consumer at the onset of the operation when the cryogenic fluid is being passed through the first heat exchanger tube 49 once, and the control unit S can be designed for guiding a mass flow of cryogenic fluid via the third bypass line 53c at the onset of the operation and so as not to guide any mass flow of cryogenic fluid via the third bypass line 53c after the predetermined period of time, optionally under the condition that the temperature downstream of the second node is at a predetermined minimum temperature.

As illustrated in FIG. 7, the bypass lines 53a, 53b, 53c can be routed at least or even completely outside of the valve blocks 11, 12, whereby the connection point to the respective connecting portion is, however, located inside the valve block 11, 12 so as to again eliminate an external T-piece or valve. In these embodiments, it might also be possible to use only one of the valve blocks 11, 12.

FIG. 15 shows an embodiment in which the bypass lines 53a, 53b, 53c are provided completely within a single valve block 11, 12, which can be implemented in a valve block as shown in FIG. 14.

The invention described herein relates in particular to the pressure management functions of the system, and any variants, particularly with respect to the economizer functions, are merely optional and not limiting, unless otherwise specified. In particular, the valve block of FIGS. 13 and 14 could, for example, also comprise only one of the inlet ports 13, 14 which is connected to the cryogenic container 1 for the removal of cryogenic fluid, i.e., the connection passage comprises only one inlet 13, 14 and only one outlet 15.

The invention claimed is:

1. A system comprising a cryogenic container (1), in particular an LNG container or a hydrogen container, and a first heat exchanger (4, 60) with a first heat exchanger tube (49) for cryogenic fluid, with a removal line (9, 10) of the cryogenic container (1) being connected to the first heat exchanger tube (49) of the first heat exchanger (4), characterized in that:
the system comprises a single-piece pressure management valve block (12) having at least a first inlet port (35), a second inlet port (36), a first outlet port (37) and a second outlet port (38), wherein at least the first inlet port (35), the first outlet port (37) and the second outlet port (38) are connected inside the single-piece pressure management valve block (12) by a first connection passage,
the first connection passage comprising a first connecting portion on an inlet side (40), a first connecting portion on an outlet side (41) and a second connecting portion on an outlet side (42), which converge at a first node (43), the single-piece pressure management valve block (12) having at least a first valve recess (45) open towards the outside, the first valve recess (45) starting at the first connecting portion on the outlet side (41), at the second connecting portion on the outlet side (42) or at the node (43),
with a first valve (46) being inserted into the first valve recess (45) of the single-piece pressure management valve block (12), and
wherein the first heat exchanger tube (49) is connected to the first inlet port (36) and the first outlet port (37) is connected to a second heat exchanger (34) protruding into the cryogenic container (1) and connected to the second inlet port (37) of the single-piece pressure management valve block (12), optionally via a second heat exchanger tube of the first heat exchanger (4).

2. A system according to claim 1, wherein the first valve recess (45) starts at the node (43) of the first connection passage, and the first valve (46) is designed as a multi-way valve between the first connecting portion on the inlet side (40), the first connecting portion on the outlet side (41) and the second connecting portion on the outlet side (42).

3. A system according to claim 2, wherein the first valve (46) allows only three switching states, wherein, in the first switching state, only the connection to the first connecting portion on the outlet side (41) is completely closed, in the second switching state, only the connection to the second connecting portion on the outlet side (42) is completely closed and, in the third switching state, both the connection to the first connecting portion on the outlet side (41) and that to the second connecting portion on the outlet side (42) are completely closed.

4. A system according to claim 2, wherein the first valve is designed for selectively throttling a connection to the first connecting portion on the outlet side (41) and a connection to the second connecting portion on the outlet side (42).

5. A system according to claim 1, wherein the single-piece pressure management valve block (12) has a second valve recess (48) open towards the outside, wherein the second valve recess (48) starts at the second connecting portion on the outlet side (42), with a second valve being inserted into the second valve recess (48), the first valve and the second valve each being proportional valves or valves with discrete switching states.

6. A system according to claim 1, wherein the second inlet port (36) within the single-piece pressure management valve block (12) is connected to the second connecting portion on the outlet side (42) via a second connecting portion on the inlet side (44).

7. A system according to claim 1, wherein the single-piece pressure management valve block (12) comprises a third outlet port (39), the second inlet port (36) within the single-piece pressure management valve block (12) being connected to the third outlet port (39) via a second connection passage (39b), the second connection passage (39b) not communicating with the first connection passage.

8. A system according to claim 1, wherein the single-piece pressure management valve block (12) comprises a third valve recess (54) open towards the outside and starting at the second connecting portion on the end side (42), with a shut-off valve being inserted into the third valve recess (42).

9. A system according to claim 1, wherein the single-piece pressure management valve block (12) has one or several sensor recesses (55) for a sensor (56), the sensor recesses being open towards the outside and starting at the first connecting portion on the inlet side (40), at the second connecting portion on the inlet side (44), at the first connecting portion on the outlet side (41) and/or at the second connecting portion on the outlet side (42).

10. A system according to claim 1, wherein the single-piece pressure management valve block (12) has a third connection passage which is not connected to the first connection passage, the third connection passage being connected to an output line for a heat exchange medium, to the cryogenic container (1) for the removal of cryogenic fluid or to the second heat exchanger (34) for the recirculation of cryogenic fluid through the second heat exchanger tube (50).

11. A system according to claim 1, further comprising a first bypass line (53a) for connecting the first heat exchanger tube (49) in parallel, a second bypass line (53b) for connecting the second heat exchanger tube of the first heat exchanger (4) in parallel and/or a third bypass line (53c) for connecting the second heat exchanger (34) in parallel, wherein at least one of the first bypass line, the second bypass line and/or the third bypass line (53a, 53b, 53c) within the single-piece pressure management valve block (12) is connected to the first connection passage or to a second connection passage.

12. A system according to claim 1, wherein the first inlet port (35) of the single-piece pressure management valve block (12) is directly connected to the first heat exchanger tube (49) or, respectively, a first outlet of the first heat exchanger (4), without any intermediate line.

13. A system according to claim 12, wherein the first heat exchanger (4, 60) comprises the second heat exchanger tube (50), and wherein the second inlet port (36) of the single-piece pressure management valve block (12) is directly connected to the second heat exchanger tube (49) or, respectively, a second outlet of the first heat exchanger (4), without any intermediate line.

14. A system according to claim 1, wherein the first heat exchanger (4) has a rod-shaped design with a generated surface (57) and two lateral surfaces (58), with the single-piece pressure management valve block (12) being arranged in an extension of the first heat exchanger (4) next to one of the lateral surfaces (58).

15. A system according to claim 1, wherein the first heat exchanger (60) comprises a jacket (57), the single-piece pressure management valve block (12) forming a lateral surface of the first heat exchanger (60) and a first end of the jacket (57) being connected to the single-piece pressure management valve block (12) in a fluid-tight manner.

16. A system according to claim 1, wherein the cryogenic container (1) has a cryogenic container jacket (2) and two end caps (3), wherein the first heat exchanger (4, 60) is arranged essentially in parallel to the cryogenic container jacket (2) and both the first heat exchanger (4, 60) and the single-piece pressure management valve block (12) next to the cryogenic container jacket (2) lie at least partially between the end caps (3).

17. A system according to claim 16, wherein the first heat exchanger (4, 60) and/or the single-piece pressure management valve block (12) protrude(s) beyond one of the end caps (3), with at least one of the inlet ports and/or outlet ports being arranged in the direction of a vehicle frame.

18. A system according to claim 1, further comprising a control unit(S) which is connected to the first valve (46) or a second valve of the single-piece pressure management valve block (12), the control unit(S) being designed for controlling a mass flow of the cryogenic fluid recirculated via the second heat exchanger.

19. A system according to claim 18, further comprising at least one sensor which is preferably inserted into a sensor recess of the single-piece pressure management valve block (13) or of an economizer valve block (12), the control unit(S) being designed for controlling the first valve (46) or the second valve depending on a measured value supplied by the sensor.

20. A system comprising a cryogenic container (1), in particular an LNG container or a hydrogen container, and a first heat exchanger (4, 60) with a first heat exchanger tube (49) for cryogenic fluid, with a removal line (9, 10) of the cryogenic container (1) being connected to the first heat exchanger tube (49) of the first heat exchanger (4), characterized in that:
the system comprises a single-piece pressure management valve block (12) having at least a first inlet port (35), a second inlet port (36), a first outlet port (37) and a second outlet port (38), wherein at least the first inlet port (35), the first outlet port (37) and the second outlet port (38) are connected inside the single-piece pressure management valve block (12) by a first connection passage,
the first connection passage comprising a first connecting portion on an inlet side (40), a first connecting portion on an outlet side (41) and a second connecting portion on an outlet side (42), which converge at a first node (43), the single-piece pressure management valve block (12) having at least a first valve recess (45) open towards the outside, the first valve recess (45) starting at the first connecting portion on the outlet side (41), at the second connecting portion on the outlet side (42) or at the node (43),
with a first valve (46) being inserted into the first valve recess (45) of the single-piece pressure management valve block (12), and
wherein the first heat exchanger tube (49) is connected to the first inlet port (36) and the first outlet port (37) is connected to a second heat exchanger (34) protruding into the cryogenic container (1) and connected to the second inlet port (37) of the single-piece pressure management valve block (12), optionally via a second heat exchanger tube of the first heat exchanger (4),
wherein the first valve (46) may be adjusted so that cryogenic fluid introduced into the first connecting portion on the inlet side (40) is supplied to the second connecting portion on the outlet side (42) or at least part of the cryogenic fluid is taken from the first connecting portion on the inlet side (40) to the first connecting portion on the outlet side (41).

* * * * *